US008290288B2

(12) United States Patent
Lin et al.

(10) Patent No.: US 8,290,288 B2
(45) Date of Patent: *Oct. 16, 2012

(54) ENCODING MACROBLOCK TYPE AND CODED BLOCK PATTERN INFORMATION

(75) Inventors: Chih-Lung Lin, Redmond, WA (US); Ming-Chieh Lee, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1393 days.

This patent is subject to a terminal disclaimer.

(21) Appl. No.: 11/903,222

(22) Filed: Sep. 20, 2007

(65) Prior Publication Data
US 2008/0019449 A1    Jan. 24, 2008

Related U.S. Application Data

(63) Continuation of application No. 11/495,355, filed on Jul. 27, 2006, now Pat. No. 7,289,673, which is a continuation of application No. 11/323,034, filed on Dec. 30, 2005, now Pat. No. 7,127,114, which is a continuation of application No. 10/733,223, filed on Dec. 10, 2003, now Pat. No. 7,054,494, which is a continuation of application No. 10/393,458, filed on Mar. 19, 2003, now Pat. No. 6,735,345, which is a continuation of application No. 09/201,272, filed on Nov. 30, 1998, now Pat. No. 6,563,953.

(51) Int. Cl.
*G06K 9/36* (2006.01)
(52) U.S. Cl. ...................................................... 382/236
(58) Field of Classification Search .......... 382/232–233, 382/236, 238, 246–248, 250; 348/394.1–395.1, 348/400.1–401.1, 412.1–416.1, 420.1–421.1, 430.1–431.1; 375/240.12–240.13, 240.18, 375/240.2, 240.23–240.25; 708/203; 709/247
See application file for complete search history.

(56) References Cited

U.S. PATENT DOCUMENTS

| 4,454,546 A | 6/1984 | Mori |
| 4,691,329 A | 9/1987 | Juri et al. |
| 4,796,087 A | 1/1989 | Guichard et al. |
| 4,800,432 A | 1/1989 | Barnett et al. |
| 4,849,812 A | 7/1989 | Borgers et al. |
| 4,999,705 A | 3/1991 | Puri |
| 5,021,879 A | 6/1991 | Vogel |

(Continued)

FOREIGN PATENT DOCUMENTS
CN    1293868 A    5/2001
(Continued)

OTHER PUBLICATIONS

U.S. Appl. No. 60/341,674, filed Dec. 17, 2001, Lee et al.
(Continued)

*Primary Examiner* — Jose Couso
(74) *Attorney, Agent, or Firm* — Klarquist Sparkman, LLP

(57) ABSTRACT

The coded block parameters used to code blocks of image samples into structures called macroblocks are compressed more efficiently by exploiting the correlation between chrominance and luminance blocks in each macroblock. In particular, the coded block pattern for chrominance and luminance are combined into a single parameter for the macroblock and jointly coded with a single variable length code. To further enhance coding efficiency, the spatial coherence of coded block patterns can be exploited by using spatial prediction to compute predicted values for coded block pattern parameters.

34 Claims, 4 Drawing Sheets

U.S. PATENT DOCUMENTS

| | | |
|---|---|---|
| 5,068,724 A | 11/1991 | Krause et al. |
| 5,089,887 A | 2/1992 | Robert et al. |
| 5,091,782 A | 2/1992 | Krause et al. |
| 5,111,292 A | 5/1992 | Kuriacose et al. |
| 5,117,287 A | 5/1992 | Koike et al. |
| 5,155,594 A | 10/1992 | Bernstein et al. |
| 5,157,490 A | 10/1992 | Kawai et al. |
| 5,193,004 A | 3/1993 | Wang et al. |
| 5,227,878 A | 7/1993 | Puri et al. |
| 5,258,836 A | 11/1993 | Murata |
| 5,274,453 A | 12/1993 | Maeda |
| 5,287,420 A | 2/1994 | Barrett |
| 5,317,397 A | 5/1994 | Odaka et al. |
| 5,319,463 A | 6/1994 | Hongu et al. |
| 5,343,248 A | 8/1994 | Fujinami |
| 5,347,308 A | 9/1994 | Wai |
| 5,376,968 A | 12/1994 | Wu et al. |
| 5,376,971 A | 12/1994 | Kadono et al. |
| 5,379,351 A | 1/1995 | Fandrianto et al. |
| 5,400,075 A | 3/1995 | Savatier |
| 5,412,435 A | 5/1995 | Nakajima |
| 5,422,676 A | 6/1995 | Herpel et al. |
| 5,426,464 A | 6/1995 | Casavant et al. |
| 5,448,297 A | 9/1995 | Alattar et al. |
| 5,453,799 A | 9/1995 | Yang et al. |
| 5,461,421 A | 10/1995 | Moon |
| 5,465,118 A | 11/1995 | Hancock et al. |
| 5,467,086 A | 11/1995 | Jeong |
| 5,477,272 A | 12/1995 | Zhang et al. |
| RE35,158 E | 2/1996 | Sugiyama |
| 5,510,840 A | 4/1996 | Yonemitsu et al. |
| 5,517,327 A | 5/1996 | Nakatani et al. |
| 5,539,466 A | 7/1996 | Igarashi et al. |
| 5,544,286 A | 8/1996 | Laney |
| 5,546,129 A | 8/1996 | Lee |
| 5,550,541 A | 8/1996 | Todd |
| 5,552,832 A | 9/1996 | Astle |
| 5,594,504 A | 1/1997 | Ebrahimi |
| 5,598,215 A | 1/1997 | Watanabe |
| 5,598,216 A | 1/1997 | Lee |
| 5,617,144 A | 4/1997 | Lee |
| 5,619,281 A | 4/1997 | Jung |
| 5,648,819 A | 7/1997 | Tranchard |
| 5,654,771 A | 8/1997 | Tekalp et al. |
| 5,666,461 A | 9/1997 | Igarashi et al. |
| 5,668,608 A | 9/1997 | Lee |
| 5,668,932 A | 9/1997 | Laney |
| 5,673,339 A | 9/1997 | Lee |
| 5,687,097 A | 11/1997 | Mizusawa et al. |
| 5,689,306 A | 11/1997 | Jung |
| 5,692,063 A | 11/1997 | Lee et al. |
| 5,699,117 A | 12/1997 | Uramoto et al. |
| 5,748,789 A | 5/1998 | Lee et al. |
| 5,767,898 A | 6/1998 | Urano et al. |
| 5,784,175 A | 7/1998 | Lee |
| 5,825,830 A | 10/1998 | Kopf |
| 5,831,559 A | 11/1998 | Agarwal et al. |
| 5,835,144 A | 11/1998 | Matsumura et al. |
| 5,835,149 A | 11/1998 | Astle |
| 5,946,042 A | 8/1999 | Kato |
| 5,946,043 A | 8/1999 | Lee et al. |
| 5,959,673 A | 9/1999 | Lee et al. |
| 5,970,173 A | 10/1999 | Lee et al. |
| 5,973,743 A | 10/1999 | Han |
| 5,982,437 A | 11/1999 | Okazaki et al. |
| 5,982,438 A | 11/1999 | Lin et al. |
| 6,011,596 A | 1/2000 | Burl et al. |
| 6,026,195 A | 2/2000 | Eifrig et al. |
| 6,035,070 A | 3/2000 | Moon et al. |
| 6,040,863 A | 3/2000 | Kato |
| 6,052,150 A | 4/2000 | Kikuchi et al. |
| 6,094,225 A | 7/2000 | Han |
| RE36,822 E | 8/2000 | Sugiyama |
| 6,122,318 A | 9/2000 | Yamaguchi et al. |
| 6,148,033 A | 11/2000 | Pearlstein et al. |
| 6,148,109 A | 11/2000 | Boon et al. |
| 6,154,495 A | 11/2000 | Yamaguchi et al. |
| 6,208,761 B1 | 3/2001 | Passaggio et al. |
| 6,215,905 B1 | 4/2001 | Lee et al. |
| 6,236,806 B1 | 5/2001 | Kojima et al. |
| RE37,222 E | 6/2001 | Yonemitsu et al. |
| 6,243,418 B1 | 6/2001 | Kim |
| 6,271,885 B2 | 8/2001 | Sugiyama |
| 6,275,528 B1 | 8/2001 | Isozaki et al. |
| 6,275,531 B1 | 8/2001 | Li |
| 6,292,585 B1 | 9/2001 | Yamaguchi et al. |
| 6,324,216 B1 | 11/2001 | Igarashi et al. |
| 6,351,563 B1 | 2/2002 | Kim et al. |
| 6,408,029 B1 | 6/2002 | McVeigh et al. |
| 6,496,601 B1 | 12/2002 | Migdal et al. |
| 6,563,953 B2 * | 5/2003 | Lin et al. ............... 382/233 |
| 6,573,905 B1 | 6/2003 | MacInnis et al. |
| 6,671,323 B1 | 12/2003 | Tahara et al. |
| 6,704,360 B2 | 3/2004 | Haskell et al. |
| 6,735,345 B2 * | 5/2004 | Lin et al. ............... 382/246 |
| 6,765,963 B2 | 7/2004 | Karczewicz et al. |
| 6,778,606 B2 | 8/2004 | Kang et al. |
| 6,785,331 B1 | 8/2004 | Jozawa et al. |
| 6,795,584 B2 | 9/2004 | Karczewicz et al. |
| 6,920,175 B2 | 7/2005 | Karczewicz et al. |
| 6,937,653 B2 | 8/2005 | Song et al. |
| 7,054,494 B2 * | 5/2006 | Lin et al. ............... 382/233 |
| 7,116,713 B2 | 10/2006 | Hagiwara |
| 7,127,114 B2 * | 10/2006 | Lin et al. ............... 382/236 |
| 7,289,673 B2 * | 10/2007 | Lin et al. ............... 382/236 |
| 7,352,905 B2 | 4/2008 | Mukerjee et al. |
| 7,453,941 B1 | 11/2008 | Yamori et al. |
| 7,606,311 B2 | 10/2009 | Hsu et al. |
| 7,822,120 B2 | 10/2010 | Kondo et al. |
| 2002/0012394 A1 | 1/2002 | Hatano et al. |
| 2002/0110196 A1 | 8/2002 | Nguyen et al. |
| 2002/0131506 A1 | 9/2002 | Kerofsky et al. |
| 2003/0113026 A1 | 6/2003 | Srinivasan et al. |
| 2003/0138150 A1 | 7/2003 | Srinivasan |
| 2003/0179826 A1 | 9/2003 | Jeon |
| 2003/0202601 A1 | 10/2003 | Bjontegaard et al. |
| 2004/0136457 A1 | 7/2004 | Funnell et al. |
| 2004/0179601 A1 | 9/2004 | Kobayashi et al. |
| 2005/0013498 A1 | 1/2005 | Srinivasan |
| 2005/0053141 A1 | 3/2005 | Holcomb et al. |
| 2005/0135484 A1 | 6/2005 | Lee |
| 2005/0152457 A1 | 7/2005 | Regunathan |
| 2005/0169374 A1 | 8/2005 | Marpe et al. |
| 2005/0254584 A1 | 11/2005 | Kim et al. |
| 2006/0257000 A1 | 11/2006 | Boyce et al. |

FOREIGN PATENT DOCUMENTS

| | | |
|---|---|---|
| EP | 0 279 053 | 8/1988 |
| EP | 0 540 350 | 5/1993 |
| EP | 0 588 653 | 3/1994 |
| EP | 0 614 318 | 9/1994 |
| EP | 0 625 853 | 11/1994 |
| EP | 0 771 114 | 5/1997 |
| EP | 0 786 907 | 7/1997 |
| EP | 0 830 029 | 3/1998 |
| JP | 61 205 086 | 9/1986 |
| JP | 3-001688 | 1/1991 |
| JP | 03-238970 | 10/1991 |
| JP | 05-199422 | 8/1993 |
| JP | 6-078295 | 3/1994 |
| JP | 06-225279 | 8/1994 |
| JP | 06-276481 | 9/1994 |
| JP | 06-276511 | 9/1994 |
| JP | 07-135660 | 5/1995 |
| JP | 7-274171 | 10/1995 |
| JP | 08-129128 | 5/1996 |
| JP | 08-140099 | 5/1996 |
| JP | 09-055936 | 2/1997 |
| JP | 09-322163 | 12/1997 |
| JP | 10-191324 | 7/1998 |
| JP | 10-276097 | 10/1998 |
| JP | 2001-036908 | 2/2001 |
| WO | WO 03/026315 | 3/2003 |
| WO | WO 03/043347 | 5/2003 |

OTHER PUBLICATIONS

U.S. Appl. No. 60/488,710, filed Jul. 18, 2003, Srinivasan et al.

Fogg, "Survey of Software and Hardware VLC Architectures," *SPIE*, vol. 2186, pp. 29-37 (1994).

Gersho et al., "Vector Quantization and Signal Compression," Entry Coding, Chapter 9, pp. 259-305 (1992).

Gibson et al., *Digital Compression of Multimedia*, "Lossless Source Coding," Chapter 2, pp. 17-62 (1998).

Gibson et al., *Digital Compression of Multimedia*, "Universal Lossless Source Coding," Chapter 3, pp. 63-112 (1998).

Gibson et al., *Digital Compression of Multimedia*, "Multimedia Conferencing Standards," Chapter 10, pp. 309-362 (1998).

Gibson et al., *Digital Compression of Multimedia*, "MPEG Compression," Chapter 11, pp. 363-418 (1998).

International Organization for Standardisation ISO/IEC JTCI/SC29/WG11, N2459, "Overview of the MPEG-4 Standards" (Oct. 1998).

ISO/IEC, "JTC1/SC29/WG11 N2202, Information Technology—Coding of Audio-Visual Objects: Visual, ISO/IEC 14496-2," 329 pp. (1998).

ISO, ISO/IEC JTC1/SC29/WG11 MPEG 97/N1642, "MPEG-4 Video Verification Model Version 7.09 3. Encoder Definition," pp. 1, 17-122, Bristol (Apr. 1997).

ISO, ISO/IEC JTC1/SC29/WG11 MPEG 97/N1642, "MPEG-4 Video Verification Model Version 7.0, 6.0 Appendix A: Combined Motion Shape Texture Coding," pp. 195-203, Bristol (Apr. 1997).

ITU-T, "ITU-T Recommendation H.263 Video Coding for Low Bit Rate Communication," 162 pp. (Feb. 1998).

ITU-T, "Draft H.263 specification," Video Coding for Low Bitrate Communication, Section 5.3: Macroblock Layer, pp. 1, 13-21 (Dec. 1995).

ITU-T, "Draft H.263 specification," Video Coding for Low Bitrate Communication, Annex E: Syntax-based Arithmetic Coding Mode, pp. i, 34-40 (Dec. 1995).

Kunt, "Second-Generation Image-Coding Techniques," *Proceedings of IEEE*, vol. 73, No. 4, pp. 549-574 (Apr. 1985).

Lainema et al., "Skip Mode Motion Compensation," Joint Video Team (JVT) of ISO/IEC MPEG & ITU-T VCEG (ISO/IEC JTC1/SC29/WG11 and ITU-T SG16 Q.6), Document JVT-C027, 8 pp. (May 2002).

Le Gall, "MPEG: A Video Compression Standard for Multimedia Applications," *Communications of the ACM*, vol. 34, No. 4, pp. 47-58 (Apr. 1991).

Lee et al., "A Layered Video Object Coding System Using Sprite and Affine Motion Model," *IEEE Transactions on Circuits and Systems for Video Technology*, vol. 7, No. 1, pp. 130-145 (Feb. 1997).

Pennebaker et al., "JPEG Still Image Data Compression Standard," Chapter 20, pp. 325-329 (1993) [no publication date].

Reader, "History of MPEG Video Compression—Ver. 4.0," 99 pp. (document marked Dec. 16, 2003).

"Video Coding for Low Bitrate Communication," Draft Recommendation H.263, International Telecommunication Union, 51 pp. (Dec. 1995).

Yu et al., "Two-Dimensional Motion Vector Coding for Low Bitrate Videophone Applications," *Proc. Int'l Conf. on Image Processing*, Los Alamitos, US, pp. 414-417, IEEE Comp. Soc. Press (1995).

Bjontegaard, "Use of run-length coding to identify coded macroblocks," ITU—Telecommunications Standardization Sector, Study Group 16 Question 6, VCEG-M29r1, 4 pp. (Apr. 2001).

Communication under Rule 51(4) EPC dated May 10, 2007, for European Patent Application No. 99965061.7, 5 pp.

Communication under Rule 71(3) EPC dated Aug. 10, 2009, from European Patent Application No. 07014945.5, 5 pp.

Communication under Rule 71(3) EPC dated Aug. 10, 2009, from European Patent Application No. 07014891.1, 5 pp.

Decision to Grant dated Feb. 13, 2006, from Japanese Patent Application No. 2000-586108, 2 pp.

Examination Report dated Apr. 27, 2006, from European Patent Application No. 99965061.7, 3 pp.

Examination Report dated Sep. 25, 2006, from European Patent Application No. 99965061.7, 3 pp.

Examination Report dated Apr. 3, 2008, from European Patent Application No. 07014945.5, 5 pp.

Examination Report dated Apr. 3, 2008, from European Patent Application No. 07014891.1, 5 pp.

Heising et al., "Video Coding Using Spatial Extrapolation Based Motion Field Segmentation," *IEEE Conf. on Image Procssing*, pp. 481-484 (Sep. 1996).

International Search Report dated Mar. 3, 2000, from International Patent Application No. PCT/US99/28276, 2 pp.

Interrogation dated Jan. 8, 2010, from Japanese Patent Application No. 2006-014153, 10 pp.

ISO/IEC 14496-2, "Coding of Audio-Visual Object—Part 2: Visual," Third Edition, pp. 1-727, (Jun. 2004).

ITU-T, "Global Motion Vector Coding (GMVC)," VCEG-O20, 10 pp. (document marked Nov. 2001).

ITU-T Recommendation H.264, "Series H: Audiovisual and Multimedia Systems, Infrastructure of Audiovisual Services—Coding of Moving Video," International Telecommunication Union, pp. 1-262 (May 2003).

ITU-T Recommendation T.800, "Series T: Terminals for Telematic Services," International Telecommunication Union, pp. 1-194 (Aug. 2002).

Kerofsky et al., "Adaptive syntax for Mbtype," ITU—Telecommunications Standardization Sector, Study Group 16 Question 6, VCEG-M14, 6 pp. (Apr. 2001).

Nakagawa et al., "Chroma Vector Adjustment for H.264/MPEG-4 AVC in Field Coding Mode," *2003 Proc. of the IEICE General Conf.*, 4 pp. (Mar. 2003). [No English translation].

Notice of Allowance dated Jul. 13, 2010, from Japanese Patent Application No. 2008-306851, 6 pp.

Notice of Allowance (Appeal Decision) dated Oct. 29, 2010, from Japanese Patent Application No. 2006-014153, 4 pp.

Notice of Allowance dated Jan. 18, 2011, from Japanese Patent Application No. 2006-014154, 6 pp.

Notice of Final Decision of Rejection dated Nov. 13, 2007, from Japanese Patent Application No. 2006-014153, 2 pp.

Notice of Rejection dated Jan. 18, 2005, from Japanese Patent Application No. 2000-586108, 4 pp.

Notice of Rejection dated Jan. 19, 2007, from Japanese Patent Application No. 2006-014153, 4 pp.

Notice of Rejection dated Dec. 11, 2009, from Japanese Patent Application No. 2006-014154, 8 pp.

Notice of Rejection dated Jun. 15, 2010, from Japanese Patent Application No. 2006-014154, 4 pp.

Notice of Rejection dated Jun. 15, 2010, from Japanese Patent Application No. 2008-306851, 3 pp.

Odaka et al., "A motion compensated prediction method for interlaced image 'Dual-prime'," Information Processing Society of Japan (IPSJ) Technical Report, vol. 94, No. 53 (94-AVM-5), pp. 17-24, Jun. 24, 1994. [No English translation].

Ono et al., "A Basic Technology of International Standard Image Encoding," First Edition, Corona Publishing Col, Ltd., pp. 227-230, Mar. 20, 1998. [No English translation].

Ono et al., "A Basic Technology of International Standard Image Encoding," First Edition, Corona Publishing Col, Ltd., pp. 293-300, Mar. 20, 1998. [No English translation].

Ono et al., "A Basic Technology of International Standard Image Encoding," First Edition, Corona Publishing Col, Ltd., pp. 253-254, Mar. 20, 1998. [No English translation].

Patel et al., "Performance of a Software MPEG Video Decoder," *Proc. of the First ACM Intl Conf on Multimedia*, pp. 75-82 (Aug. 1993).

Search Report dated Jan. 15, 2008, from European Patent Application No. 07014945.5, 3 pp.

Search Report dated Jan. 15, 2008, from European Patent Application No. 07014891.1, 3 pp.

Sullivan et al., "Meeting Report of the Thirteenth Meeting (Meeting M) of the ITU-T Video Coding Experts Group," ITU—Telecommunications Standardization Sector, Study Group 16, VCEG-M82d1, 34 pp. (Apr. 2001).

Sun et al., "Improved TML Loop Filter with Lower Complexity," ITU-T VCEG-N17, 8 pp. (Aug. 2001).

Written Opinion dated Nov. 2, 2000, from International Patent Application No. PCT/US99/28276, 4 pp.

\* cited by examiner

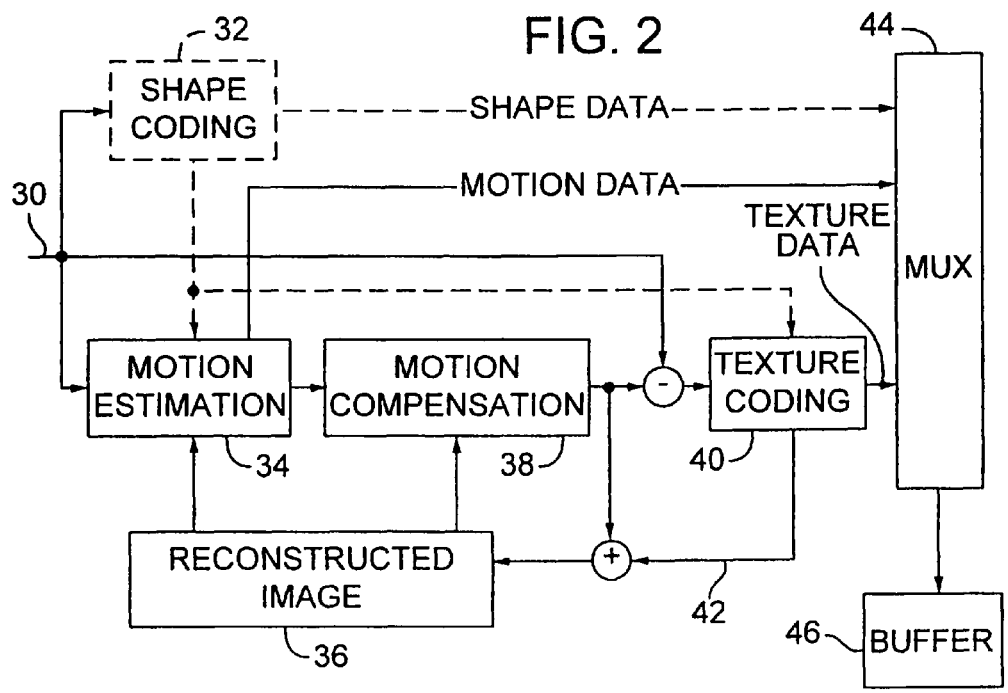
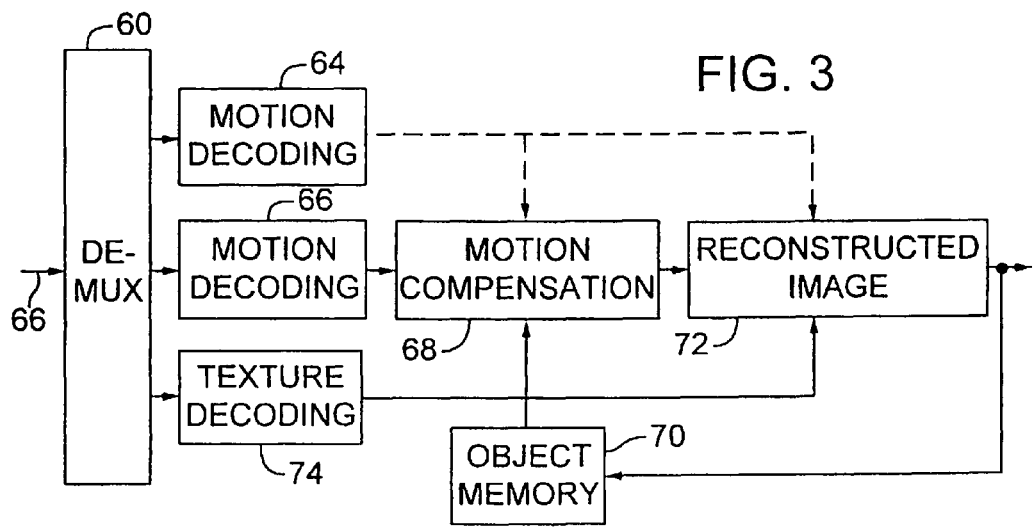

ENCODING MACROBLOCK TYPE AND CODED BLOCK PATTERN INFORMATION

RELATED APPLICATION INFORMATION

The present application is a continuation of U.S. patent application Ser. No. 11/495,355, filed Jul. 27, 2006, which is a continuation of U.S. patent application Ser. No. 11/323,034, filed Dec. 30, 2005, now U.S. Pat. No. 7,127,114, which is a continuation of U.S. patent application Ser. No. 10/733,223, filed Dec. 10, 2003, now U.S. Pat. No. 7,054,494, which is a continuation of U.S. patent application Ser. No. 10/393,458 filed Mar. 19, 2003, now U.S. Pat. No. 6,735,345, which is a continuation of U.S. patent application Ser. No. 09/201,272, filed Nov. 30, 1998, now U.S. Pat. No. 6,563,953, the disclosures of which are hereby incorporated herein by reference.

TECHNICAL FIELD

The invention relates to video coding, and specifically, to an improved method for coding block parameters used in frame-based and object-based video coding formats.

BACKGROUND

Full-motion video displays based upon analog video signals have long been available in the form of television. With recent advances in computer processing capabilities and affordability, full-motion video displays based upon digital video signals are becoming more widely available. Digital video systems can provide significant improvements over conventional analog video systems in creating, modifying, transmitting, storing, and playing full-motion video sequences.

Digital video displays include large numbers of image frames that are played or rendered successively at frequencies of between 30 and 75 Hz. Each image frame is a still image formed from an array of pixels based on the display resolution of a particular system. As examples, VHS-based systems have display resolutions of 320×480 pixels, NTSC-based systems have display resolutions of 720×486 pixels, and high-definition television (HDTV) systems under development have display resolutions of 1360×1024 pixels.

The amounts of raw digital information included in video sequences are massive. Storage and transmission of these amounts of video information is infeasible with conventional personal computer equipment. Consider, for example, a digitized form of a relatively low resolution VHS image format having a 320×480 pixel resolution. A full-length motion picture of two hours in duration at this resolution corresponds to 100 gigabytes of digital video information. By comparison, conventional compact optical disks have capacities of about 0.6 gigabytes, magnetic hard disks have capacities of 1-2 gigabytes, and compact optical disks under development have capacities of up to 8 gigabytes.

To address the limitations in storing or transmitting such massive amounts of digital video information, various video compression standards or processes have been established, including MPEG-1, MPEG-2, and H.26X. These video compression techniques utilize similarities between successive image frames, referred to as temporal or interframe correlation, to provide interframe compression in which motion data and error signals are used to encode changes between frames.

In addition, the conventional video compression techniques utilize similarities within image frames, referred to as spatial or intraframe correlation, to provide intraframe compression in which the image samples within an image frame are compressed. Intraframe compression is based upon conventional processes for compressing still images, such as discrete cosine transform (DCT) encoding. This type of coding is sometimes referred to as "texture" or "transform" coding. A "texture" generally refers to a two-dimensional array of image sample values, such as an array of chrominance and luminance values or an array of alpha (opacity) values. The term "transform" in this context refers to how the image samples are transformed into spatial frequency components during the coding process. This use of the term "transform" should be distinguished from a geometric transform used to estimate scene changes in some interframe compression methods.

Interframe compression typically utilizes motion estimation and compensation to encode scene changes between frames. Motion estimation is a process for estimating the motion of image samples (e.g., pixels) between frames. Using motion estimation, the encoder attempts to match blocks of pixels in one frame with corresponding pixels in another frame. After the most similar block is found in a given search area, the change in position of the pixel locations of the corresponding pixels is approximated and represented as motion data, such as a motion vector. Motion compensation is a process for determining a predicted image and computing the error between the predicted image and the original image. Using motion compensation, the encoder applies the motion data to an image and computes a predicted image. The difference between the predicted image and the input image is called the error signal. Since the error signal is just an array of values representing the difference between image sample values, it can be compressed using the same texture coding method as used for intraframe coding of image samples.

Although differing in specific implementations, the MPEG-1, MPEG-2, and H.26X video compression standards are similar in a number of respects. The following description of the MPEG-2 video compression standard is generally applicable to the others.

MPEG-2 provides interframe compression and intraframe compression based upon square blocks or arrays of pixels in video images. A video image is divided into image sample blocks called macroblocks having dimensions of 16×16 pixels. In MPEG-2, a macroblock comprises four luminance blocks (each block is 8×8 samples of luminance (Y)) and two chrominance blocks (one 8×8 sample block each for Cb and Cr).

In MPEG-2, interframe coding is performed on macroblocks. An MPEG-2 encoder performs motion estimation and compensation to compute motion vectors and block error signals. For each block $M_N$ in an image frame N, a search is performed across the image of a next successive video frame N+1 or immediately preceding image frame N−1 (i.e., bi-directionally) to identify the most similar respective blocks $M_{N+1}$ or $M_{N-1}$. The location of the most similar block relative to the block $M_N$ is encoded with a motion vector (DX,DY). The motion vector is then used to compute a block of predicted sample values. These predicted sample values are compared with block $M_N$ to determine the block error signal. The error signal is compressed using a texture coding method such as discrete cosine transform (DCT) encoding.

Object-based video coding techniques have been proposed as an improvement to the conventional frame-based coding standards. In object-based coding, arbitrary shaped image features are separated from the frames in the video sequence using a method called "segmentation." The video objects or "segments" are coded independently. Object-based coding can improve the compression rate because it increases the interframe correlation between video objects in successive frames. It is also advantageous for variety of applications that require access to and tracking of objects in a video sequence.

In the object-based video coding methods proposed for the MPEG-4 standard, the shape, motion and texture of video objects are coded independently. The shape of an object is represented by a binary or alpha mask that defines the boundary of the arbitrary shaped object in a video frame. The motion of an object is similar to the motion data of MPEG-2, except that it applies to an arbitrary-shaped image of the object that has been segmented from a rectangular frame. Motion estimation and compensation is performed on blocks of a "video object plane" rather than the entire frame. The video object plane is the name for the shaped image of an object in a single frame.

The texture of a video object is the image sample information in a video object plane that falls within the object's shape. Texture coding of an object's image samples and error signals is performed using similar texture coding methods as in frame-based coding. For example, a segmented image can be fitted into a bounding rectangle formed of macroblocks. The rectangular image formed by the bounding rectangle can be compressed just like a rectangular frame, except that transparent macroblocks need not be coded. Partially transparent blocks are coded after filling in the portions of the block that fall outside the object's shape boundary with sample values in a technique called "padding."

Frame-based coding techniques such as MPEG-2 and H26X and object-based coding techniques proposed for MPEG-4 are similar in that they perform intraframe and interframe coding on macroblocks. Each macroblock includes a series of overhead parameters that provide information about the macroblock. As an example, FIG. 1 shows macroblock parameters used in the header of an interframe macroblock. The COD parameter (10) is a single bit indicating whether the interframe macroblock is coded. In particular, this bit indicates whether or not the encoded macroblock includes motion data and texture coded error data. In cases where the motion and error signal data are zero, the COD bit reduces the information needed to code the macroblock because only a single bit is sent rather than additional bits indicating that the motion vector and texture data are not coded.

In addition to the COD bit, the coding syntax for macroblocks includes coded block parameters (CBP) indicating whether the coded transform coefficients for chrominance and luminance are transmitted for the macroblock. If the transform coefficients are all zero for a block, then there is no need to send texture data for the block. The Coded Block Parameters for chrominance (CBPC) are two bits indicating whether or not coded texture data is transmitted for each of the two chrominance blocks.

The CBPC bits are encoded along with another flag that provides information about the type of quantization for the macroblock. These flags are combined to form a parameter called MCBPC (12), and MCBPC is entropy coded using an entropy coding method such as Huffman or arithmetic coding.

The parameter called the AC_Pred_flag (14) is a flag indicating whether AC prediction is used in the macroblock.

The Coded Block Pattern for luminance (CBPY) (16) is comprised of four bits indicating whether or not coded texture data is transmitted for each of the four luminance blocks. Like the MCBPC parameter, the CBPY flags are also entropy coded using either Huffman or arithmetic coding.

After the CBPY parameter, the macroblock includes encoded motion vector data (shown as item 18 in FIG. 1).

Following the motion vector data, the "block data" represents the encoded texture data for the macroblock (shown as block data 20 in FIG. 1).

One drawback of the coding approach illustrated in FIG. 1 is that it codes CBPC and CBPY flags separately, and therefore, does not exploit the correlation between these parameters to reduce the macroblock overhead. In addition, it does not take advantage of the spatial dependency of the coded block parameters.

SUMMARY

The invention provides an improved method of coding the macroblock header parameters in video coding applications. One aspect of the invention is a coding method that exploits the correlation between the coded block parameters by jointly coding all of the coded block parameters with a single variable length code. Another aspect of the invention is a coding method that takes advantage of the spatial dependency between the coded block patterns of neighboring blocks.

In an implementation of the invention, the coded block parameters for luminance and chrominance in a macroblock are formed into a single, combined parameter for the macroblock. The combined parameter is assigned a variable length code from a variable length coding table. The coding table is trained based on a target bit rate (e.g., low bit rate Internet applications) and a target class of video content (e.g., talking head video). By jointly coding the luminance and chrominance values, the encoder exploits the correlation between these parameters in the macroblock.

To improve the coding efficiency further, the implementation uses prediction to take advantage of the spatial dependency of the coded block parameters of neighboring blocks. Before assigning the variable length code to the combined parameter, some of the coded block parameters are predicted from neighboring blocks. For intra frame macroblocks, for example, the encoder computes a spatially predicted value for each coded block parameter for luminance. This spatially predicted parameter forms part of the combined parameter for the macroblock.

Additional features and advantages of the invention will become more apparent from the following detailed description and accompany drawings of an implementation of the invention.

BRIEF DESCRIPTION OF THE DRAWINGS

FIG. 2 is a block diagram of a video coder.

FIG. 3 is a block diagram of a video decoder.

DETAILED DESCRIPTION

Introduction

Figure 1:
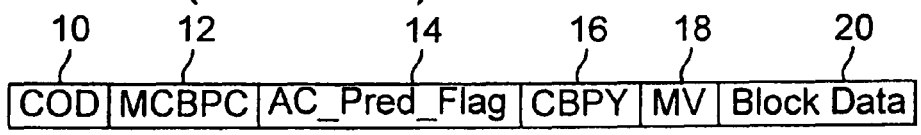
FIG. 1 is a diagram illustrating an example of a macroblock header used in a standard video coding process.

The first section below provides a description of a video encoder and decoder. Subsequent sections describe how to improve the coding of macroblock header parameters by exploiting the correlation between CBPC and CBPY parameters and taking advantage of the spatial dependency of coded block parameters of neighboring blocks.

Useful in both frame-based and object-based video coding, the invention improves the coding of macroblock parameters, whether the macroblocks are components of arbitrary video objects segmented from a sequence of frames or of rectangular shaped image frames. Object-based coding uses similar motion and texture coding modules as used in frame-based coding. In addition, object-based coders also include shape coding modules. The block syntax relevant to the invention is similar in both frame-based and object-based coding. While the encoder and decoder described in the next section are object-based, they provide a sufficient basis for explaining how to implement the invention in both frame-based and object-based coding schemes.

Description of an Example Encoder and Decoder

FIG. 2 is a block diagram illustrating an implementation of an object-based video encoder. The input 30 to the encoder includes a series of objects, their shape information and bounding rectangles. The shape information, therefore, is available before the encoder codes texture or motion data. Frame-based coding differs in that the entire frame is coded without shape information.

The shape coding module 32 receives the definition of an object including its bounding rectangle and extends the bounding rectangle to integer multiples of macroblocks. The shape information for an object comprises a mask or "alpha plane." The shape coding module 32 reads this mask and compresses it, using for example, a conventional chain coding method to encode the contour of the object.

Motion estimation module 34 reads an object including its bounding rectangle and a previously reconstructed image 36 and computes motion estimation data used to predict the motion of the object from one frame to another. After identifying the macroblocks in the current object image, the motion estimation module 34 searches for the most similar macroblock in the reconstructed image for each macroblock in the current object image to compute the motion data for each macroblock. The specific format of the motion data from the motion estimation module 34 can vary depending on the motion estimation method used. The implementation described below computes a motion vector for each macroblock, which is consistent with current MPEG and H26X formats.

The motion compensation module 38 reads the motion vectors computed by the motion estimation module and the previously reconstructed image 36 and computes a predicted image for the current frame. The encoder finds the difference between the image sample values in the input image block as specified in the input 30 and the corresponding sample values in the predicted image block as computed in the motion compensation module 38 to determine the error signal for the macroblock.

Texture coding module 40 compresses this error signal for inter-frame coded objects and compresses image sample values for the object from the input data stream 30 for intra-frame coded objects. The feedback path 42 from the texture coding module 40 represents the decoded error signal. The encoder uses the error signal macroblocks along with the predicted image macroblocks from the motion compensation module to compute the previously reconstructed image 36.

The texture coding module 40 codes blocks of intra-frame and error signal data for an object using any of a variety of still image compression techniques. Example compression techniques include transform-based techniques such as DCT and wavelet coding as well as other conventional image compression methods such as LaPlacian Pyramid coding.

The bitstream of the compressed video sequence includes the shape, motion and texture coded information from the shape coding, motion estimation, and texture coding modules. Multiplexer 44 combines and formats this data into the proper syntax and outputs it to the buffer 46.

While the encoder can be implemented in hardware or software, it is most likely implemented in software. In a software implementation, the modules in the encoder represent software instructions stored in memory of a computer and executed in the processor and the video data stored in memory. A software encoder can be stored and distributed on a variety of conventional computer readable media. In hardware implementations, the encoder modules are implemented in digital logic, preferably in an integrated circuit. Some of the encoder functions can be optimized in special-purpose digital logic devices in a computer peripheral to off-load the processing burden from a host computer.

FIG. 3 is a block diagram illustrating a decoder for an object-based video coding method. A demultiplexer 60 receives a bitstream 62 representing a compressed video sequence and separates shapes, motion and texture encoded data on an object by object basis. Shape decoding module 64 decodes the shape or contour for the current object being processed. To accomplish this, it employs a shape decoder that implements the inverse of the shape encoding method used in the encoder of FIG. 2. The resulting shape data is a mask, such as a binary alpha plane or gray scale alpha plane representing the shape of the object.

The motion decoding module 66 decodes the motion information in the bitstream. The decoded motion information includes motion data such as motion vectors for macroblocks blocks or geometric transform coefficients, depending on the type of estimation method used in the encoder. The motion decoding module 66 provides this motion information to the motion compensation module 68, and the motion compensation module 68 applies the motion data to previously reconstructed object data 70.

The texture decoding module 74 decodes error signals for inter-frame coded texture data and an array of color values for intra-frame texture data and passes this information to a module 72 for computing and accumulating the reconstructed image. For inter-frame coded objects, this module 72 applies the error signal data to the predicted image output from the motion compensation module to compute the reconstructed object for the current frame. For intra-frame coded objects the texture decoding module 74 decodes the image sample values for the object and places the reconstructed object in the reconstructed object module 72. Previously reconstructed objects are temporarily stored in object memory 70 and are used to construct the object for other frames.

Like the encoder, the decoder can be implemented in hardware, software or a combination of both. In software implementations, the modules in the decoder are software instructions stored in memory of a computer and executed by the processor and video data stored in memory. A software decoder can be stored and distributed on a variety of conventional computer readable media. In hardware implementations, the decoder modules are implemented in digital logic, preferably in an integrated circuit. Some of the decoder functions can be optimized in special-purpose digital logic devices in a computer peripheral to off-load the processing burden from a host computer.

Improved Coding of Macroblock Overhead

The invention includes innovations that improve the coding of macroblock header parameters. One innovation is a method for coding the coded block parameters to exploit the correlation between CBPC and CBPY. This innovation is implemented by jointly coding a combined CBPC and CBPY parameter with a single variable length code. Another innovation further improves coding efficiency of the header parameters by exploiting the spatial dependency of the coded block parameters. In particular, coded block parameters are more efficiently compressed by predicting them from the parameter of neighboring blocks.

Figure 4:
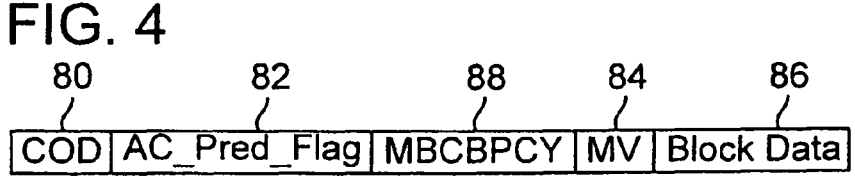
FIG. 4 is a diagram illustrating an example of an improved macroblock header in which the coded block parameters for chrominance and luminance are jointly coded with a single variable length code.

FIG. 4 is a diagram illustrating the header block parameters computed by an implementation of the invention. Like the header information shown in FIG. 1, this header block includes a COD parameter 80, an AC_Pred_flag 82, motion vector data (MV 84) and block data 86. Unlike the header in FIG. 1, MCBPC and CBPY parameters are jointly coded with a single variable length code, called MBCBPCY 88. This code combines coded block parameters for chrominance and luminance, as well as the flag for macroblock type.

Figure 5:
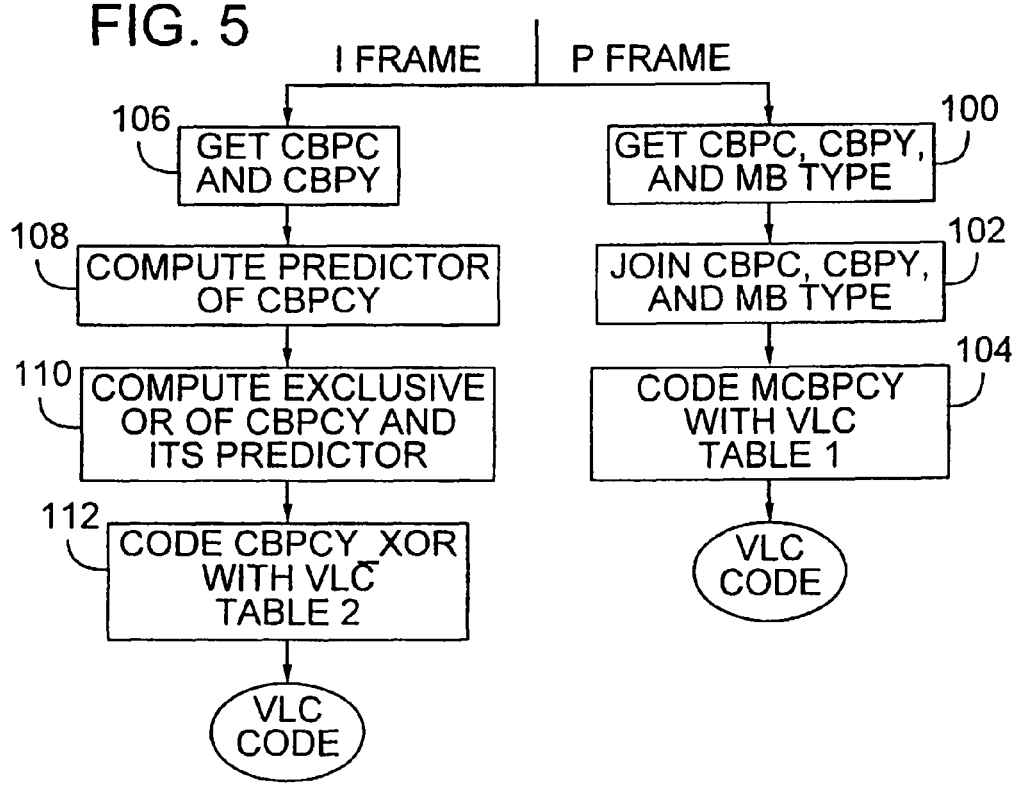
FIG. 5 is a flow diagram illustrating how an implementation of the invention computes a single variable length code for the coded block parameters of I and P frame macroblocks.

FIG. 5 is a flow diagram illustrating how the implementation generates a variable length code for Intra (I) frames and predicted (P) frames. In this particular implementation, the header blocks for I and P frames are coded differently. For I frames, the encoder performs the additional step of predicting the coded block parameters for luminance before selecting the variable length code. It is also possible to use prediction for P frames. However, prediction does not improve coding efficiency significantly in P frames, and in some cases, can even decrease coding efficiency.

The goal of using prediction for coded block parameters is to produce as many zero values for these parameters as possible. By making the values mostly zero, the encoder reduces the variance of the coded block parameters. The process of training the variable length coding table can then favor the zero value, which improves coding efficiency. In P frames, especially in low bit rate applications, the coded block parameters are mostly zero before prediction. As such, prediction does not tend to increase the number of zero values, and sometimes, it even decreases the number of zero values. Therefore, the implementation shown in FIG. 5 does not use prediction for P frames.

For P frames, the encoder begins by finding the coded block parameters for luminance and chrominance as shown in step 100. These block parameters are each a single bit indicating whether a corresponding block is texture coded. The coded block parameters are computed in the texture coding module (40 in FIG. 2), which sets a coded block flag for each block that has non-zero encoded texture values. Conversely, the value of the coded block parameter for a block in which the texture values are all zero (or so close to zero as to be negligible) is zero.

Since there are two blocks for chrominance (one each for the 8 by 8 pixel U and V blocks) and four blocks for luminance (one each for the four 8 by 8 blocks) in the macroblock, the combined parameter for the coded block pattern is a total of six bits. Combining this 6 bit number with the single bit for macroblock type, the encoder forms a 7 bit number as shown in step 102. The macroblock type indicates whether the macroblock is for an I or P frame.

Once the combined MBCBPCY is formed, the combined parameter is looked up in a variable length coding table to find a corresponding variable length code associated with the parameter as shown in step 104. The encoder assigns a single variable length code to the combined parameter MBCBPCY.

The coding table in the implementation table is a Huffman coding table. The table is preferably trained based on the target rate and target scenario. Table 1 below is a Variable Length Coding (VLC) table obtained for a low bit rate "talking head" scenario. For each macroblock in a P frame, the combined MBCBPCY information is coded using the code word for the corresponding entry in this table.

TABLE 1

VLC Table for Coded block pattern of chrominance and luminance for P picture

| Index | MB type | CBPCY Y(1234)UV | Number of bits | Code |
|---|---|---|---|---|
| 0 | I | 000000 | 7 | 1000000 |
| 1 | I | 000001 | 13 | 1001111001001 |
| 2 | I | 000010 | 12 | 100111111101 |
| 3 | I | 000011 | 15 | 000000111111100 |
| 4 | I | 000100 | 12 | 100111111100 |
| 5 | I | 000101 | 18 | 000000101010000011 |
| 6 | I | 000110 | 17 | 10010110100110100 |
| 7 | I | 000111 | 16 | 1000001110111100 |
| 8 | I | 001000 | 12 | 100000111010 |
| 9 | I | 001001 | 17 | 00000011111111000 |
| 10 | I | 001010 | 16 | 0000001111111101 |
| 11 | I | 001011 | 16 | 0000001111111111 |
| 12 | I | 001100 | 13 | 0000001111001 |
| 13 | I | 001101 | 18 | 000000101010000010 |
| 14 | I | 001110 | 16 | 1001011010011101 |
| 15 | I | 001111 | 16 | 0000000101010100 |
| 16 | I | 010000 | 12 | 100101111000 |
| 17 | I | 010001 | 17 | 00000010101000011 |
| 18 | I | 010010 | 15 | 100000111011111 |
| 19 | I | 010011 | 17 | 00000011111111001 |
| 20 | I | 010100 | 13 | 1001011110011 |
| 21 | I | 010101 | 18 | 100101101001101011 |
| 22 | I | 010110 | 18 | 100101111011111001 |
| 23 | I | 010111 | 16 | 0000001111111010 |
| 24 | I | 011000 | 14 | 10000011101110 |
| 25 | I | 011001 | 20 | 10010110100110101011 |
| 26 | I | 011010 | 16 | 1001011010011100 |
| 27 | I | 011011 | 18 | 100101111011111000 |
| 28 | I | 011100 | 13 | 1001011010010 |
| 29 | I | 011101 | 18 | 000000101010000101 |
| 30 | I | 011110 | 16 | 1001011010011110 |
| 31 | I | 011111 | 15 | 100101111001000 |
| 32 | I | 100000 | 12 | 000000111101 |
| 33 | I | 100001 | 17 | 10010111101111111 |
| 34 | I | 100010 | 16 | 0000000101010010 |
| 35 | I | 100011 | 16 | 1001011010011111 |
| 36 | I | 100100 | 14 | 10010111101110 |
| 37 | I | 100101 | 21 | 100101101001101010101 |
| 38 | I | 100110 | 17 | 10010111101111101 |
| 39 | I | 100111 | 17 | 10010111101111110 |
| 40 | I | 101000 | 12 | 100111100101 |
| 41 | I | 101001 | 18 | 000000101010000001 |
| 42 | I | 101010 | 19 | 1001011010011010100 |
| 43 | I | 101011 | 16 | 1000001110111101 |
| 44 | I | 101100 | 13 | 0000001111000 |
| 45 | I | 101101 | 16 | 1001011010011011 |
| 46 | I | 101110 | 16 | 0000001111111110 |
| 47 | I | 101111 | 16 | 0000001010100101 |
| 48 | I | 110000 | 13 | 0000001111110 |
| 49 | I | 110001 | 18 | 000000101010000000 |
| 50 | I | 110010 | 16 | 0000001010100011 |
| 51 | I | 110011 | 16 | 0000001111111011 |
| 52 | I | 110100 | 13 | 1000001110110 |
| 53 | I | 110101 | 18 | 000000101010000100 |
| 54 | I | 110110 | 15 | 000000101010011 |
| 55 | I | 110111 | 15 | 100101111001001 |
| 56 | I | 111000 | 13 | 0000001010101 |
| 57 | I | 111001 | 21 | 100101101001101010100 |

TABLE 1-continued

VLC Table for Coded block pattern of chrominance and luminance for P picture

| Index | MB type | CBPCY Y(1234)UV | Number of bits | Code |
|---|---|---|---|---|
| 58 | I | 111010 | 15 | 100101111011110 |
| 59 | I | 111011 | 14 | 10010111100101 |
| 60 | I | 111100 | 10 | 1001011011 |
| 61 | I | 111101 | 15 | 100101101001100 |
| 62 | I | 111110 | 12 | 100101101011 |
| 63 | I | 111111 | 12 | 100101101010 |
| 64 | P | 000000 | 2 | 01 |
| 65 | P | 000001 | 7 | 0000000 |
| 66 | P | 000010 | 6 | 100110 |
| 67 | P | 000011 | 9 | 100101011 |
| 68 | P | 000100 | 3 | 111 |
| 69 | P | 000101 | 10 | 1000001111 |
| 70 | P | 000110 | 9 | 000000100 |
| 71 | P | 000111 | 12 | 000000101000 |
| 72 | P | 001000 | 3 | 110 |
| 73 | P | 001001 | 10 | 1000001010 |
| 74 | P | 001010 | 9 | 100101000 |
| 75 | P | 001011 | 12 | 000000101011 |
| 76 | P | 001100 | 5 | 10001 |
| 77 | P | 001101 | 11 | 00000011011 |
| 78 | P | 001110 | 9 | 100111010 |
| 79 | P | 001111 | 11 | 10011111111 |
| 80 | P | 010000 | 4 | 0011 |
| 81 | P | 010001 | 10 | 1001110111 |
| 82 | P | 010010 | 9 | 100000110 |
| 83 | P | 010011 | 12 | 100000111001 |
| 84 | P | 010100 | 4 | 1011 |
| 85 | P | 010101 | 10 | 1001111011 |
| 86 | P | 010110 | 9 | 100101100 |
| 87 | P | 010111 | 11 | 10010111111 |
| 88 | P | 011000 | 6 | 001001 |
| 89 | P | 011001 | 12 | 000000110101 |
| 90 | P | 011010 | 10 | 1001111110 |
| 91 | P | 011011 | 13 | 1001111001000 |
| 92 | P | 011100 | 6 | 000001 |
| 93 | P | 011101 | 11 | 10010101010 |
| 94 | P | 011110 | 10 | 1000001000 |
| 95 | P | 011111 | 12 | 000000101001 |
| 96 | P | 100000 | 4 | 0001 |
| 97 | P | 100001 | 10 | 1001010100 |
| 98 | P | 100010 | 9 | 100101110 |
| 99 | P | 100011 | 12 | 100000111000 |
| 100 | P | 100100 | 6 | 100100 |
| 101 | P | 100101 | 11 | 10011110011 |
| 102 | P | 100110 | 10 | 1001110110 |
| 103 | P | 100111 | 13 | 1001011110110 |
| 104 | P | 101000 | 5 | 00001 |
| 105 | P | 101001 | 10 | 1001111010 |
| 106 | P | 101010 | 9 | 100111110 |
| 107 | P | 101011 | 12 | 000000111110 |
| 108 | P | 101100 | 6 | 001000 |
| 109 | P | 101101 | 11 | 10000010011 |
| 110 | P | 101110 | 10 | 0000001100 |
| 111 | P | 101111 | 11 | 10010111110 |
| 112 | P | 110000 | 5 | 10100 |
| 113 | P | 110001 | 11 | 10000010010 |
| 114 | P | 110010 | 10 | 1001010011 |
| 115 | P | 110011 | 12 | 100101111010 |
| 116 | P | 110100 | 6 | 100001 |
| 117 | P | 110101 | 11 | 10010101011 |
| 118 | P | 110110 | 10 | 1001010011 |
| 119 | P | 110111 | 12 | 000000110100 |
| 120 | P | 111000 | 5 | 10101 |
| 121 | P | 111001 | 10 | 1001111000 |
| 122 | P | 111010 | 10 | 1001010010 |
| 123 | P | 111011 | 12 | 100101101000 |
| 124 | P | 111100 | 5 | 00101 |
| 125 | P | 111101 | 10 | 0000001011 |
| 126 | P | 111110 | 8 | 10011100 |
| 127 | P | 111111 | 10 | 0000001110 |

In the implementation shown in FIG. 5, I frames are coded differently than P frames in that the encoder uses prediction to exploit the spatial dependency of the coded block parameters. For each macroblock, the encoder begins by getting the coded block parameters for chrominance and luminance as shown in step 106.

Next, the encoder computes the predictor of the coded block parameters for luminance. In this particular implementation, the encoder only uses prediction for the CBPY parameters. However, the same prediction method could also be used to predict the coded block parameters for chrominance. In the case of chrominance, the prediction is computed based on 8 by 8 pixel chrominance blocks in neighboring macroblocks rather than the neighboring 8 by 8 pixel luminance blocks, which may be in the same macroblock or a neighboring macroblock. Since each macroblock has four luminance blocks, the neighboring blocks for a given luminance block may come from the same or neighboring macroblock. For prediction involving chrominance blocks, the neighboring blocks come from neighboring macroblocks.

The encoder performs spatial prediction on coded block parameters. First, it looks at the coded block parameters for neighboring blocks to determine whether the value of the block parameter is likely to change from a neighboring block to the current block of interest. If the location of a block representing the smallest change in the coded block parameter can be identified (i.e. the lowest spatial gradient in the coded block parameters), then the coded block parameter for the block at this location is used as the predictor. Otherwise, it does not matter which neighbor is chosen as the predictor and one is merely selected. A specific example of selecting the predictor is described and illustrated in more detail with reference to FIGS. 6-8 below.

In the next step 110, the encoder computes a predicted value for the coded block parameters. The predicted value represents the change in the coded block parameter for the predictor block and the current block. To compute the predicted value, the encoder performs a bitwise exclusive OR (XOR) on the predicted value and current block value. The resulting vector, called CBPCY_XOR is then assigned a variable length code from a Huffman table. The encoder looks up the entry for CPCY_XOR in the table and finds the corresponding variable length code. Table 2 below shows the VLC table used to code predicted CBPCY values for I frames in the implementation.

TABLE 2

VLC Table for Coded block pattern of chrominance and luminance for I picture

| Index | CBPCY_XOR Y(1234)UV | Number of bits | Code |
|---|---|---|---|
| 0 | 000000 | 1 | 1 |
| 1 | 000001 | 6 | 010111 |
| 2 | 000010 | 5 | 01001 |
| 3 | 000011 | 5 | 00101 |
| 4 | 000100 | 5 | 00110 |
| 5 | 000101 | 9 | 001000111 |
| 6 | 000110 | 7 | 0100000 |
| 7 | 000111 | 7 | 0010000 |
| 8 | 001000 | 5 | 00010 |
| 9 | 001001 | 9 | 001111100 |
| 10 | 001010 | 7 | 0111010 |
| 11 | 001011 | 7 | 0011101 |
| 12 | 001100 | 6 | 000010 |
| 13 | 001101 | 9 | 011101100 |
| 14 | 001110 | 8 | 01110111 |
| 15 | 001111 | 8 | 00000000 |
| 16 | 010000 | 5 | 00011 |
| 17 | 010001 | 9 | 010110111 |
| 18 | 010010 | 7 | 0101100 |
| 19 | 010011 | 7 | 0010011 |

TABLE 2-continued

VLC Table for Coded block pattern of chrominance and luminance for I picture

| Index | CBPCY_XOR Y(1234)UV | Number of bits | Code |
|---|---|---|---|
| 20 | 010100 | 6 | 000001 |
| 21 | 010101 | 10 | 0101101000 |
| 22 | 010110 | 8 | 01000110 |
| 23 | 010111 | 8 | 00111111 |
| 24 | 011000 | 6 | 011110 |
| 25 | 011001 | 13 | 0011100010010 |
| 26 | 011010 | 9 | 010110101 |
| 27 | 011011 | 8 | 01000010 |
| 28 | 011100 | 7 | 0100010 |
| 29 | 011101 | 11 | 00111000101 |
| 30 | 011110 | 10 | 0100011110 |
| 31 | 011111 | 9 | 010000111 |
| 32 | 100000 | 4 | 0110 |
| 33 | 100001 | 9 | 000000011 |
| 34 | 100010 | 7 | 0011110 |
| 35 | 100011 | 6 | 011100 |
| 36 | 100100 | 7 | 0010010 |
| 37 | 100101 | 12 | 001110001000 |
| 38 | 100110 | 9 | 001000100 |
| 39 | 100111 | 9 | 001110000 |
| 40 | 101000 | 6 | 011111 |
| 41 | 101001 | 11 | 01000111110 |
| 42 | 101010 | 8 | 00111001 |
| 43 | 101011 | 9 | 010001110 |
| 44 | 101100 | 7 | 0000001 |
| 45 | 101101 | 11 | 00111000110 |
| 46 | 101110 | 9 | 010110110 |
| 47 | 101111 | 9 | 001000101 |
| 48 | 110000 | 6 | 010100 |
| 49 | 110001 | 11 | 01000111111 |
| 50 | 110010 | 9 | 001111101 |
| 51 | 110011 | 9 | 000011000 |
| 52 | 110100 | 7 | 0000111 |
| 53 | 110101 | 11 | 00111000111 |
| 54 | 110110 | 9 | 010000110 |
| 55 | 110111 | 9 | 000011001 |
| 56 | 111000 | 6 | 010101 |
| 57 | 111001 | 10 | 0111011011 |
| 58 | 111010 | 9 | 000000010 |
| 59 | 111011 | 9 | 001000110 |
| 60 | 111100 | 8 | 00001101 |
| 61 | 111101 | 13 | 0011100010011 |
| 62 | 111110 | 10 | 0111011010 |
| 63 | 111111 | 10 | 0101101001 |

Figure 6:
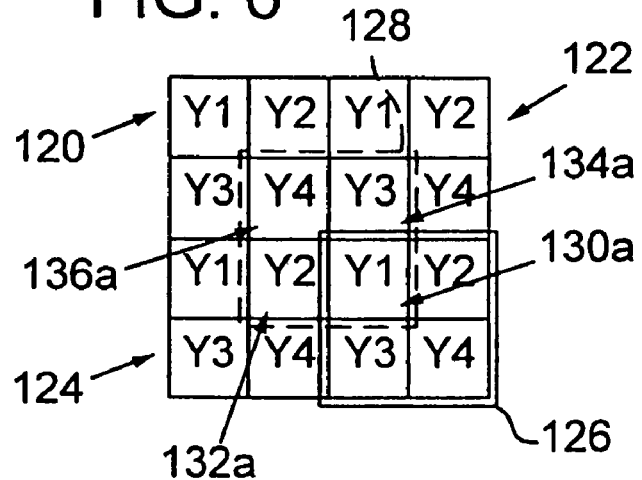
FIG. 6 is a diagram illustrating four macroblocks, and their corresponding luminance (Y) blocks.
Figure 7:
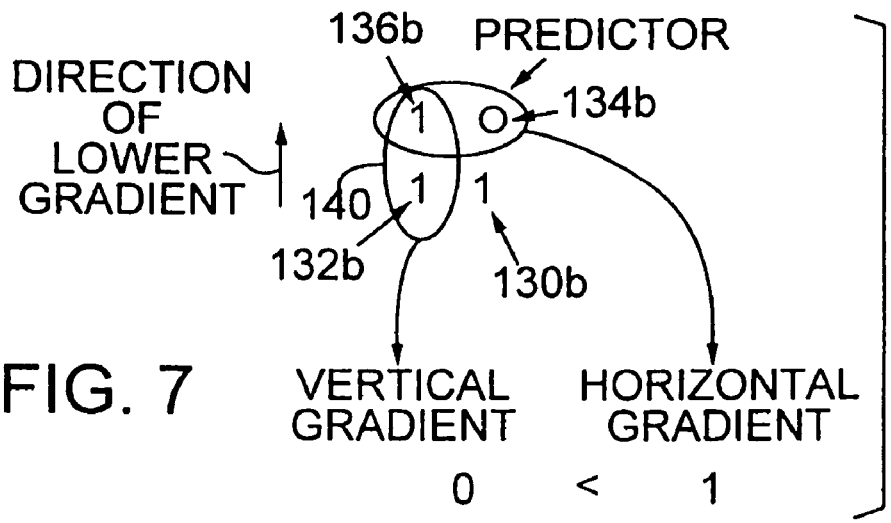
FIG. 7 is a diagram showing an example of the vertical and horizontal gradients of coded block parameter values for selected luminance blocks in FIG. 6.
Figure 8:
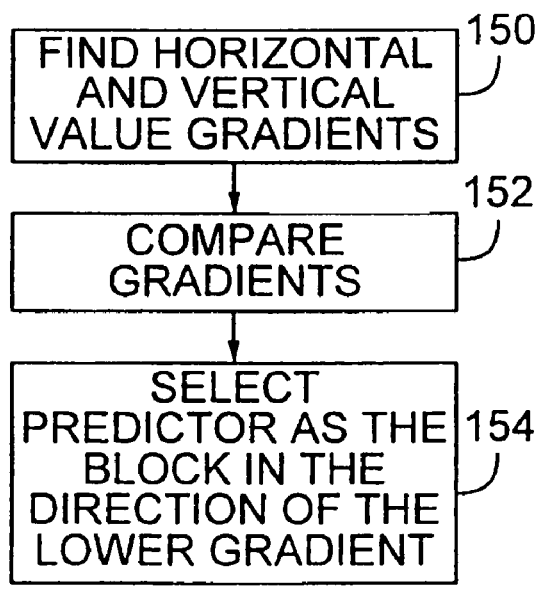
FIG. 8 is a flow diagram illustrating a method for computing a predictor for coded block parameters.

FIGS. 6-8 illustrate the spatial prediction performed in the encoder in more detail. FIG. 6 is a diagram showing four neighboring macroblocks (top left-120, top right-122, lower left-124, and lower right-126). The following example focuses on the lower right block, which is circled. Each of the macroblocks includes four 8 by 8 pixel blocks for luminance labeled as Y1, Y2, Y3 and Y4.

As an example, consider the top left luminance block Y1 for macroblock 126. The blocks used to compute the predictor are surrounded by a dashed line 128. The block of interest is Y1 (labeled as block 130*a*), and the blocks used to compute the predictor are the neighboring blocks labeled as 132*a*, 134*a*, and 136*a*.

To give a specific example, FIG. 7 shows values of the coded block pattern parameters for each of the blocks within the dashed line of FIG. 6. The reference numbers 130*b*, 132*b*, 134*b* and 136*b* correspond to the blocks 130*a*, 132*a*, 134*a* and 136*a* of FIG. 6, respectively. The spatial gradients of the neighboring coded blocks parameters are used to select the predictor. In particular, the vertical gradient is computed from the coded block parameters of the top-left and left neighboring blocks (136*a*, 132*a*, shown circled 140 in FIG. 7). The horizontal gradient is computed from the coded block parameters of the top-left and top neighboring blocks (136*a*, 134*a*, shown circled 142 in FIG. 7).

FIG. 8 is a flow diagram illustrating the steps for finding the predictor. First, the encoder finds the vertical and horizontal gradients. Each is computed as the exclusive OR of the coded block parameters shown circled in FIG. 7 (140 is the vertical gradient and 142 is the horizontal gradient). Next, the encoder compares the gradient values. If the gradients are not the same, the encoder selects the predictor as the value assigned to the block in the direction of the lower gradient. In the example shown in FIG. 7, the vertical gradient is zero, while the horizontal gradient is one. Thus, the direction of the lower gradient is up. As such, the value of the coded block parameter for block 134*a* is used as the predictor because it is located in the "up" direction relative to the block of interest.

Whether or not prediction is used to modify the coded block parameters, the end result is a single variable length code representing all of the coded block parameters for the macroblock. Since I and P frames are coded differently in the implementation, the decoder treats the macroblocks for these frames differently. For P frames, the decoder uses VLC table 1 to look up the single variable length code and find the corresponding entry that stores the combined parameter representing the coded block parameters for luminance and chrominance. For I frames, the decoder uses VLC table 2 to look up the single variable length code and find the corresponding entry that stores the combined parameter representing coded block parameters for luminance and chrominance. In both I and P frames, the texture decoding module (block 74 in FIG. 3) uses the coded block parameters to determine whether the texture data for the corresponding block needs to be decoded. The decoder skips texture decoding for blocks having a coded block parameter of zero.

In cases where the coded block parameters are also predicted, the decoder uses the previously decoded block parameters from the neighboring blocks to compute the coded block parameter for the current block of interest. First, the decoder computes the location of the predictor block based on the spatial gradients in the same manner as in the encoder. Next, it computes the value of the coded block parameter for the current block by computing the exclusive OR of the decoded value and the coded block parameter of the predictor block (the exclusive OR operator has the following property: XXOR Y=Z; Z XOR X=Y). After this inverse prediction stage, the texture decoder then uses the coded block parameter to determine whether to skip decoding the texture for the block.

Brief Overview of a Computer System

Figure 9:
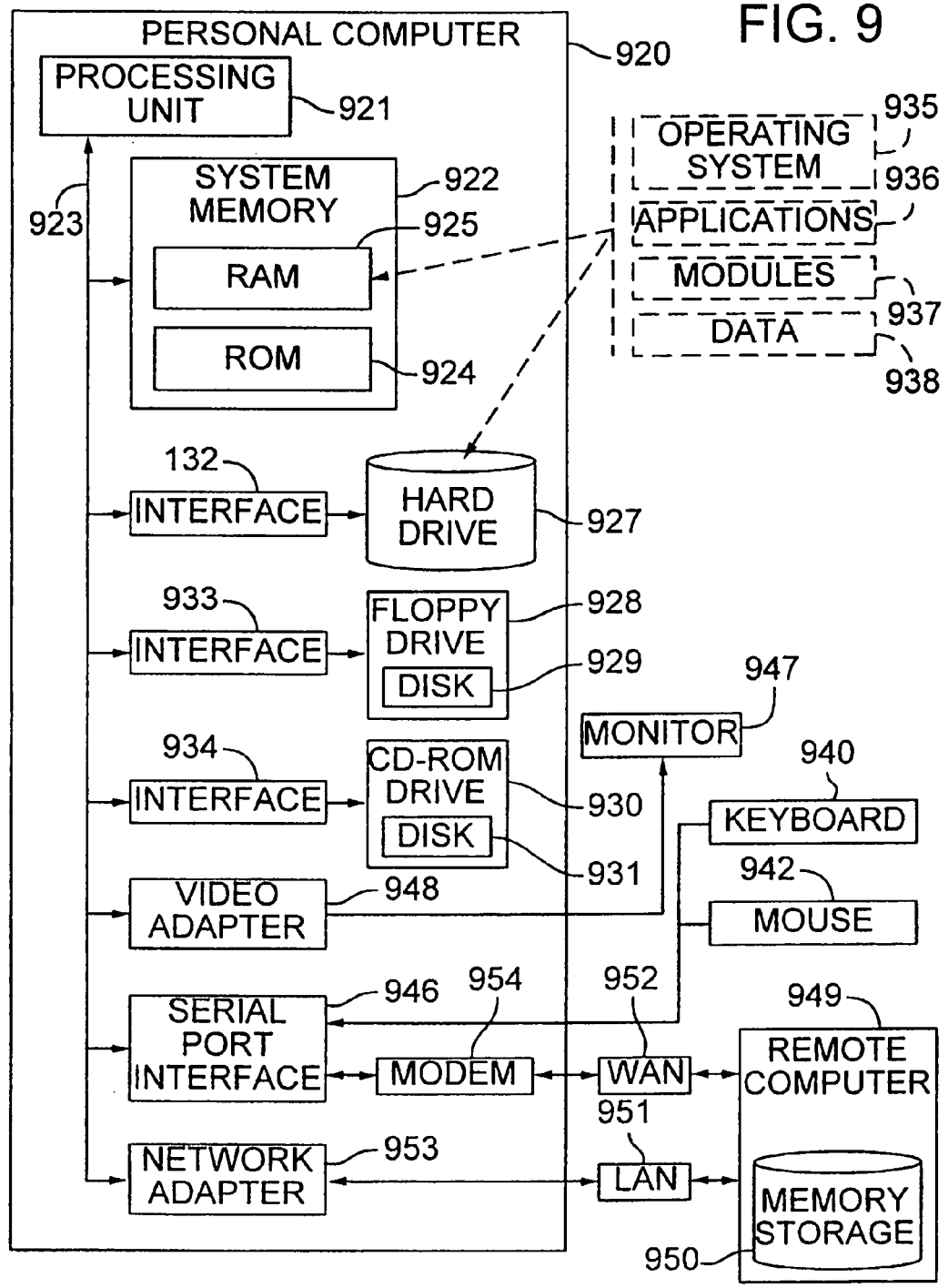
FIG. 9 is a diagram of a computer system that serves as an operating environment for a software implementation of the invention.

FIG. 9 and the following discussion are intended to provide a brief, general description of a suitable computing environment in which the invention may be implemented. Although the invention or aspects of it may be implemented in a hardware device, the encoder and decoder described above are implemented in computer-executable instructions organized in program modules. The program modules include the routines, programs, objects, components, and data structures that perform the tasks and implement the data types described above.

While FIG. 9 shows a typical configuration of a desktop computer, the invention may be implemented in other computer system configurations, including hand-held devices, multiprocessor systems, microprocessor-based or programmable consumer electronics, minicomputers, mainframe computers, and the like. The invention may also be used in distributed computing environments where tasks are performed by remote processing devices that are linked through a communications network. In a distributed computing environment, program modules may be located in both local and remote memory storage devices.

FIG. 9 illustrates an example of a computer system that serves as an operating environment for the invention. The computer system includes a personal computer 920, including a processing unit 921, a system memory 922, and a system bus 923 that interconnects various system components including the system memory to the processing unit 921. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 924 and random access memory (RAM) 925. A basic input/output system 926 (BIOS), containing the basic routines that help to transfer information between elements within the personal computer 920, such as during start-up, is stored in ROM 924. The personal computer 920 further includes a hard disk drive 927, a magnetic disk drive 928, e.g., to read from or write to a removable disk 929, and an optical disk drive 930, e.g., for reading a CD-ROM disk 931 or to read from or write to other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide nonvolatile storage of data, data structures, computer-executable instructions (program code such as dynamic link libraries, and executable files), etc. for the personal computer 920. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 925, including an operating system 935, one or more application programs 936, other program modules 937, and program data 938. A user may enter commands and information into the personal computer 920 through a keyboard 940 and pointing device, such as a mouse 942. Other input devices (not shown) may include a microphone, joystick, game pad, satellite dish, scanner, or the like. These and other input devices are often connected to the processing unit 921 through a serial port interface 946 that is coupled to the system bus, but may be connected by other interfaces, such as a parallel port, game port or a universal serial bus (USB). A monitor 947 or other type of display device is also connected to the system bus 923 via an interface, such as a display controller or video adapter 948. In addition to the monitor, personal computers typically include other peripheral output devices (not shown), such as speakers and printers.

The personal computer 920 may operate in a networked environment using logical connections to one or more remote computers, such as a remote computer 949. The remote computer 949 may be a server, a router, a peer device or other common network node, and typically includes many or all of the elements described relative to the personal computer 920, although only a memory storage device 950 has been illustrated in FIG. 9. The logical connections depicted in FIG. 9 include a local area network (LAN) 951 and a wide area network (WAN) 952. Such networking environments are commonplace in offices, enterprise-wide computer networks, intranets and the Internet.

When used in a LAN networking environment, the personal computer 920 is connected to the local network 951 through a network interface or adapter 953. When used in a WAN networking environment, the personal computer 920 typically includes a modem 954 or other means for establishing communications over the wide area network 952, such as the Internet. The modem 954, which may be internal or external, is connected to the system bus 923 via the serial port interface 946. In a networked environment, program modules depicted relative to the personal computer 920, or portions thereof, may be stored in the remote memory storage device. The network connections shown are merely examples and other means of establishing a communications link between the computers may be used.

CONCLUSION

While the invention has been illustrated using specific implementation as an example, the scope of the invention is not limited to the specific implementation. For example, it is possible to use spatial prediction for both chrominance and luminance blocks using similar techniques. In addition, spatial prediction may be used for coding the coded block parameters for both intra and predicted frames. The implementation uses Huffman tables to generate variable length codes. In fact, a variety of entropy coding methods may be used to generate a variable length code for each combined coded block parameter. For instance, various forms of arithmetic and/or run length encoding may be used. Each of these coding methods assign longer codes to input signals that occur less frequently while assigning shorter coders to more frequent input signals. As noted above, the coding methods for improving the efficiency of macroblock headers can be applied to frame-based and object based coding methods.

In view of the many possible implementations of the invention, it should be recognized that the implementation described above is only an example of the invention and should not be taken as a limitation on the scope of the invention. Rather, the scope of the invention is defined by the following claims. We therefore claim as our invention all that comes within the scope and spirit of these claims.

We claim:
1. In a computer system that implements a video encoder, a method of processing one or more video images in a video sequence, the method comprising:
   with the computer system that implements the video encoder, encoding macroblock type information for a macroblock, first coded block pattern information for plural luminance blocks of the macroblock, and second coded block pattern information for plural chrominance blocks of the macroblock, wherein the first coded block pattern information indicates whether any of the plural luminance blocks have transform coefficient data in a bitstream, wherein the second coded block pattern information indicates whether any of the plural chrominance blocks have transform coefficient data in the bitstream, wherein the macroblock has a macroblock type indicated at least in part by the macroblock type information, and wherein the encoding comprises:
      determining an entropy code that reflects joint entropy coding of the macroblock type information together with the first coded block pattern information and the second coded block pattern information, and
      outputting the entropy code in the bitstream, whereby a decoder that receives the entropy code, based at least in part upon the entropy code, determines the macroblock type and whether any of the plural luminance blocks and the plural chrominance blocks of the macroblock have transform coefficient data in the bitstream.

2. The method of claim 1 wherein the macroblock type is intra for the macroblock.

3. The method of claim 2 further comprising repeating the encoding for each of one or more other intra type macroblocks.

4. The method of claim 1 further comprising:
encoding macroblock type information for a second macroblock, first coded block pattern information for plural luminance blocks of the second macroblock, and second coded block pattern information for plural chrominance blocks of the second macroblock, wherein the second macroblock has a macroblock type indicated at least in part by the macroblock type information for the second macroblock.

5. The method of claim 4 wherein the macroblock type of the second macroblock is inter.

6. The method of claim 1 wherein the macroblock consists of four 8×8 luminance blocks and two 8×8 chrominance blocks.

7. The method of claim 1 wherein the entropy code is a variable length code.

8. The method of claim 1 wherein the encoding comprises arithmetic coding.

9. In a computer system that implements a video encoder, a method of processing one or more video images in a video sequence, the method comprising:
with the computer system that implements the video encoder, encoding macroblock type information for an intra macroblock, first coded block pattern information for plural luminance blocks of the intra macroblock, and second coded block pattern information for plural chrominance blocks of the intra macroblock, wherein the first coded block pattern information indicates whether any of the plural luminance blocks have transform coefficient data in a bitstream, wherein the second coded block pattern information indicates whether any of the plural chrominance blocks have transform coefficient data in the bitstream, wherein the intra macroblock has a macroblock type indicated at least in part by the macroblock type information, and wherein the encoding comprises:
determining a variable length code that reflects joint encoding of the macroblock type information together with the first coded block pattern information and the second coded block pattern information, and
outputting the variable length code in the bitstream, whereby a decoder that receives the variable length code, based at least in part upon the variable length code, determines the macroblock type and whether any of the plural luminance blocks and the plural chrominance blocks of the intra macroblock have transform coefficient data in the bitstream.

10. The method of claim 9 further comprising repeating the encoding for each of one or more other intra macroblocks.

11. The method of claim 9 further comprising:
encoding macroblock type information for a second macroblock, first coded block pattern information for plural luminance blocks of the second macroblock, and second coded block pattern information for plural chrominance blocks of the second macroblock, wherein the second macroblock has a macroblock type indicated at least in part by the macroblock type information for the second macroblock.

12. The method of claim 11 wherein the macroblock type of the second macroblock is inter.

13. The method of claim 9 wherein the intra macroblock consists of four 8×8 luminance blocks and two 8×8 chrominance blocks.

14. A computer-readable medium storing computer-executable instructions for causing a computer system programmed thereby to perform a method comprising:
encoding macroblock type information for a macroblock, first coded block pattern information for plural luminance blocks of the macroblock, and second coded block pattern information for plural chrominance blocks of the macroblock, wherein the first coded block pattern information indicates whether any of the plural luminance blocks have transform coefficient data in a bitstream, wherein the second coded block pattern information indicates whether any of the plural chrominance blocks have transform coefficient data in the bitstream, wherein the macroblock has a macroblock type indicated at least in part by the macroblock type information, and wherein the encoding comprises:
determining an entropy code that reflects joint entropy coding of the macroblock type information together with the first coded block pattern information and the second coded block pattern information, and
outputting the entropy code in the bitstream, whereby a decoder that receives the entropy code, based at least in part upon the entropy code, determines the macroblock type and whether any of the plural luminance blocks and the plural chrominance blocks of the macroblock have transform coefficient data in the bitstream.

15. The computer-readable medium of claim 14 wherein the macroblock type is intra for the macroblock.

16. The computer-readable medium of claim 14 wherein the method further comprises repeating the encoding for each of one or more other intra type macroblocks.

17. The computer-readable medium of claim 14 wherein the method further comprises:
encoding macroblock type information for a second macroblock, first coded block pattern information for plural luminance blocks of the second macroblock, and second coded block pattern information for plural chrominance blocks of the second macroblock, wherein the second macroblock has a macroblock type indicated at least in part by the macroblock type information for the second macroblock, and wherein the macroblock type of the second macroblock is inter.

18. The computer-readable medium of claim 14 wherein the macroblock consists of four 8×8 luminance blocks and two 8×8 chrominance blocks.

19. The computer-readable medium of claim 14 wherein the entropy code is a variable length code.

20. The computer-readable medium of claim 14 wherein the encoding comprises arithmetic coding.

21. The method of claim 1 wherein the computer system is a handheld device.

22. The method of claim 1 wherein the computer system is a multi-processor system.

23. The method of claim 1 wherein the computer system includes a processing unit, memory, a network connection, a display, a speaker, and a microphone.

24. The method of claim 1 wherein the video encoder is implemented in software.

25. The method of claim 1 wherein the video encoder is at least in part implemented in one or more special-purpose digital logic devices to offload processing from a host.

26. The method of claim 1 wherein the method further comprises:
- with special-purpose digital logic, performing motion estimation to find motion data for the macroblock;
- with special-purpose digital logic, performing motion compensation using the motion data for the macroblock to determine predicted blocks for the macroblock;
- determining differences between the macroblock and the predicted blocks; and
- with special-purpose digital logic, coding the differences, wherein the coding includes performing a frequency transform to produce transform coefficients for at least some of the blocks of the macroblock, and wherein the first coded block pattern information and the second coded block pattern information for the macroblock depend on values for the coded differences for the blocks of the macroblock.

27. The method of claim 1 wherein the determining the entropy code includes looking up the entropy code in a table that includes plural entries, each of the plural entries indicating a different value for the entropy code.

28. The method of claim 9 wherein the computer system includes a processing unit, memory, a network connection, a display, a speaker, and a microphone.

29. The method of claim 9 wherein the video encoder is at least in part implemented in one or more special-purpose digital logic devices to offload processing from a host.

30. The method of claim 9 wherein the method further comprises:
- with special-purpose digital logic, performing motion estimation to find motion data for the macroblock;
- with special-purpose digital logic, performing motion compensation using the motion data for the macroblock to determine predicted blocks for the macroblock;
- determining differences between the macroblock and the predicted blocks; and
- with special-purpose digital logic, coding the differences, wherein the coding includes performing a frequency transform to produce transform coefficients for at least some of the blocks of the macroblock, and wherein the first coded block pattern information and the second coded block pattern information for the macroblock depend on values for the coded differences for the blocks of the macroblock.

31. A computer system that implements a video encoder to perform a method of video encoding, wherein the computer system includes a processing unit, memory, a network connection, a display, a speaker, a microphone and one or more special-purpose digital logic devices, and wherein the video encoder is at least in part implemented in the one or more special-purpose digital logic devices, the method comprising:
- encoding macroblock type information for a macroblock, first coded block pattern information for plural luminance blocks of the macroblock, and second coded block pattern information for plural chrominance blocks of the macroblock, wherein the first coded block pattern information indicates whether any of the plural luminance blocks have corresponding transform coefficient data in a bitstream, wherein the second coded block pattern information indicates whether any of the plural chrominance blocks have corresponding transform coefficient data in the bitstream, wherein the macroblock has a macroblock type indicated at least in part by the macroblock type information, and wherein the encoding comprises:
  - determining a code that reflects joint entropy coding of:
    - (a) the macroblock type information together with
    - (b) the first coded block pattern information and
    - (c) the second coded block pattern information, and
  - outputting the code in the bitstream, whereby a decoder that receives the code, based at least in part upon the code, determines the macroblock type and whether any of the plural luminance blocks and the plural chrominance blocks of the macroblock have corresponding transform coefficient data in the bitstream.

32. The computer system of claim 31 further comprising: encoding macroblock type information for a second macroblock, first coded block pattern information for plural luminance blocks of the second macroblock, and second coded block pattern information for plural chrominance blocks of the second macroblock, wherein the first coded block pattern information indicates whether the plural luminance blocks of the second macroblock have corresponding transform coefficient data in the bitstream, wherein the second coded block pattern information indicates whether the plural chrominance blocks of the second macroblock have corresponding transform coefficient data in the bitstream, wherein the second macroblock has a macroblock type indicated at least in part by the macroblock type information for the second macroblock.

33. The computer system of claim 32 wherein the macroblock type of the first macroblock is intra and the macroblock type of the second macroblock is inter.

34. The computer system of claim 31 wherein the code is a variable length code.

* * * * *